United States Patent
Igari (10) Patent No.: US 7,343,500 B2
(45) Date of Patent: Mar. 11, 2008

(54) ELECTRONIC DEVICE WITH SERIAL ATA INTERFACE AND POWER-SAVING CONTROL METHOD USED IN THE DEVICE

(75) Inventor: Fubito Igari, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 11/074,492

(22) Filed: Mar. 7, 2005

(65) Prior Publication Data

US 2005/0268010 A1 Dec. 1, 2005

(30) Foreign Application Priority Data

May 26, 2004 (JP) .............................. 2004-156232

(51) Int. Cl.
*G06F 1/00* (2006.01)
*G06F 1/32* (2006.01)

(52) U.S. Cl. .................. 713/300; 713/320; 713/323

(58) Field of Classification Search ................ 713/300, 713/320, 323; 711/114
See application file for complete search history.

(56) References Cited

U.S. PATENT DOCUMENTS

| | | | |
|---|---|---|---|
| 7,010,711 B2* | 3/2006 | Bashford et al. | 713/323 |
| 7,020,834 B2* | 3/2006 | Chiang et al. | 714/799 |
| 7,028,199 B2* | 4/2006 | Ayyavu et al. | 713/323 |
| 7,080,201 B2* | 7/2006 | Suzuki et al. | 711/114 |
| 2003/0163617 A1 | 8/2003 | Shigenobu | |
| 2004/0268169 A1 | 12/2004 | Bashford et al. | |
| 2005/0144490 A1 | 6/2005 | Igari | |
| 2005/0160221 A1 | 7/2005 | Yamazaki et al. | |
| 2005/0235171 A1 | 10/2005 | Igari | |

FOREIGN PATENT DOCUMENTS

| | | |
|---|---|---|
| EP | 1566797 A2 | 8/2005 |
| JP | 2000-181584 | 6/2000 |
| JP | 2001-135009 | 5/2001 |
| WO | WO 03/063000 A1 | 7/2003 |

* cited by examiner

*Primary Examiner*—Suresh K Suryawanshi
(74) *Attorney, Agent, or Firm*—Foley & Lardner LLP (57) ABSTRACT

An electronic device has a serial ATA interface and an inhibition-signal generator. The serial ATA interface transmits data to another electronic device with a serial ATA interface connected thereto via a bus. The inhibition-signal generator is configured to generate an inhibition signal to inhibit at least one of a restoration request and a power saving request. The restoration request has the function of requesting the other electronic device to restore its serial ATA interface from a power-saving state to the non power-saving state. The power saving request is supplied from the other electronic device to the electronic device for requesting the serial ATA interface of the electronic device to shift to a power-saving state from a non power saving state.

17 Claims, 4 Drawing Sheets

ELECTRONIC DEVICE WITH SERIAL ATA INTERFACE AND POWER-SAVING CONTROL METHOD USED IN THE DEVICE

CROSS-REFERENCE TO RELATED APPLICATIONS

This application is based upon and claims the benefit of priority from prior Japanese Patent Application No. 2004-156232, filed May 26, 2004, the entire contents of which are incorporated herein by reference.

BACKGROUND OF THE INVENTION

1. Field of the Invention

The present invention relates to an electronic device with a serial AT Attachment (ATA) interface, and more particularly to an electronic device of this type, represented by a disk drive, suitable for power saving, and a power-saving control method for use in the electronic device.

2. Description of the Related Art

Standards for serial ATA (SATA) interfaces have recently been established. Serial ATA interfaces are used as interfaces between a peripheral device represented by a hard disk drive and a host (host system) represented by a personal computer. In this point, serial ATA interfaces are similar to conventional ATA interfaces (i.e., parallel ATA interfaces).

A peripheral device having the serial ATA interface, such as a hard disk drive (HDD), is connected to a host by a serial ATA bus. In such an HDD, to secure compatibility with a parallel ATA interface, it is necessary to convert a parallel ATA interface into a serial ATA interface, and convert a serial ATA interface into a parallel ATA interface. Such interface conversion is performed by, for example, an LSI (bridge LSI) called a serial ATA interface control circuit (serial ATA bridge). A serial ATA interface control circuit is provided for the HDD.

The standards for serial ATA interfaces (hereinafter referred to as "the serial ATA standards") stipulate three layers of different functions, i.e., a physical layer, link layer and transport layer. The physical layer interprets received data, and transmits the data to the link layer in accordance with the interpretation result. The physical layer has a function for executing high-rate serial data transmission and reception. The physical layer also outputs a serial data signal to the link layer in response to a request therefrom. The link layer supplies the physical layer with a request to output a signal. The physical layer also supplies the transport layer with the data transmitted from the physical layer. The transport layer performs conversion for an operation conforming to the standards for parallel ATA interfaces (hereinafter referred to as "the parallel ATA standards"). Assuming that the above-mentioned serial ATA interface control circuit is used in an HDD, the role of the transport layer corresponds to the role of the ATA signal output unit of a conventional host that utilizes a parallel ATA connection.

The serial ATA interface control circuit has processing units for performing process related to the physical layer, link layer and transport layer. The serial ATA interface control circuit is connected to the disk controller (HDC) of the HDD via a parallel ATA bus (or a bus compliant with the parallel ATA bus) based on the ATA interface standards. Accordingly, in the connection between the serial ATA interface control circuit and HDC of the HDD, operations equivalent to those stipulated in the ATA interface standards or conforming to the standards are performed.

The serial ATA standards stipulate three power management modes for serial ATA interfaces, i.e., "PHY READY (Idle)", "Partial" and "Slumber" modes. The "Idle (PHY READY)" mode indicates a mode (non power-saving mode) for setting a non power-saving state. The non power-saving state means a state in which a physical-layer processing unit for realizing the operation of the physical layer and a main phase-locked loop (PLL) circuit operate, and the interface states of a host and peripheral device are synchronized with each other. The "Partial" mode and "Slumber" mode are modes (power-saving modes) for setting a power-saving state. The power-saving state means that the physical-layer processing unit is operating, and an interface signal is in a neutral logic state.

The difference by definition between the "Partial" mode and "Slumber" mode lies in the time required for restoration therefrom to the "PHY READY (Idle)" mode. More specifically, it is stipulated that the time required for restoration from the "Partial" mode must not exceed 10 µs. On the other hand, it is stipulated that the time required for restoration from the "Slumber" mode must not exceed 10 ms. As long as the restoration time and interface power state conform to the standards, manufacturers can select the portion of a device, the power-saving function of which should be executed in the "Partial" or "Slumber" mode (i.e., can select the circuit that should be turned off in the mode).

The serial ATA standards stipulate the procedure of transition from the "PHY READY (Idle)" mode (i.e., non power-saving mode) to the "Partial" or "Slumber" mode (i.e., power-saving mode), and the procedure of restoration from the "Partial" or "Slumber" mode. However, they do not stipulate the minimum time ranging from the time when the state is once shifted, to the time when a restoration operation is performed.

Jpn. Pat. Appln. KOKAI Publication No. 2000-181584 discloses a technique (hereinafter referred to as "the prior art") for saving the power of an apparatus having a serial interface circuit. This prior art is employed in a serial interface circuit for periodically performing a communication operation, such as one based on the IEEE 1394 serial interface. The prior art is characterized in that the stopping of the periodic supply of a clock to a serial interface circuit and restart of the periodic supply are controlled. In other words, in the prior art, the power saving of the apparatus is realized by controlling periodic stop and restart of the operation of the serial interface circuit. However, power saving is realized only when the serial interface circuit periodically performs a communication operation.

In contrast, the power-saving mode stipulated in the serial ATA standards is controllable from both the host side and peripheral device side. Therefore, immediately after the host or peripheral device sets an arbitrary power-saving mode, the node of the host or peripheral device may determine that restoration from a power-saving state to an "Idle" state (non power-saving state) is needed. In general, a node that tries to be restored from the power-saving state to the "Idle" state can confirm its power-saving state. However, this node cannot confirm the power-saving state (in particular, the transitional state) of another node (hereinafter referred to as "the connected node") connected to the first-mentioned node. Accordingly, the node that tries to be restored from the power-saving state to the "Idle" state issues a restoration request to the connected node, regardless of the power-saving state of the connected node.

A consideration will now be given to the power-saving operation of an electronic circuit formed of a plurality of circuit elements. In this case, each circuit element as a preset target of power saving generally has a power-saving structure unique thereto. In a circuit of this type, to complete the operation of transition to a power-saving state, it is necessary to shift all preset circuit elements to a designated power-saving state. The shift of each circuit element to a power-saving state is performed by a predetermined procedure. Accordingly, in the above-mentioned electronic circuit, an intermediate state in which transition to a power-saving state is occurring exists until all circuit elements as power-saving targets are shifted to the designated power-saving state.

Assume here that a node has supplied a request for restoration from a power-saving state, to another node connected thereto and incorporating a plurality of electronic circuits that are now in the above-mentioned intermediate state. In this case, it is possible that the restoration request fails to reach the electronic circuits in the node. If the restoration request fails to be received, restoration from the power-saving state cannot reliably be performed. Such a restoration error occurs when, for example, some circuit elements are still operating and others have shifted to the power-saving state. Furthermore, the circuit elements may require a predetermined period to shift to the power-saving state. In other words, the circuit elements may assume the above-mentioned intermediate state. Also in this case, a restoration error similar to the above may well occur.

BRIEF SUMMARY OF THE INVENTION

An electronic device includes a serial ATT interface and an inhibition-signal generator. The serial ATA interface is used to transmit data to another electronic device with a serial ATA interface connected thereto via a bus. The inhibition-signal generator is configured to generate an inhibition signal to inhibit at least one of (1) a restoration request and (2) a power saving request. The restoration request is used to request the another electronic device to restore the serial ATA interface of the another electronic device from a power-saving state to the non power-saving state. The power saving request is supplied from the another electronic device to the electronic device for requesting the serial ATA interface of the electronic device to shift to a power-saving state from a non power saving state.

In accordance with an embodiment of the invention, there is provided an electronic device with a serial ATA interface for transmitting data to another electronic device with a serial ATA interface connected thereto via a serial ATA bus, when the serial ATA bus is in a non power-saving state. The device includes a restoration-request-inhibition-signal generator configured to generate a restoration-request inhibition signal used to inhibit transmission of a restoration-request signal pattern for requesting the another electronic device to restore the serial ATA interface of the another electronic device from a power-saving state to the non power-saving state. The restoration-request-inhibition-signal generator asserts the restoration-request inhibition signal for a preset period after transition to the power-saving state is started. A restoration-request output unit is configured to output the restoration-request signal pattern, to be transmitted to the anther electronic device, in response to a request for restoration from the power-saving state to the non power-saving state. The request occurs in the electronic device, and the restoration-request output unit delays the output of the restoration-request signal pattern until the restoration-request inhibition signal is negated. These action take place when the restoration request occurs in a period in which the restoration-request inhibition signal is asserted.

In accordance with another embodiment of the invention, there is provided an electronic device with a serial ATA interface for transmitting data to another electronic device with a serial ATA interface connected thereto via a serial ATA bus. The device includes a reception-inhibition-signal generator configured to generate a reception inhibition signal used to inhibit reception of a power-saving request supplied from the another electronic device for requesting the serial ATA interface to shift to a power-saving state. The reception-inhibition-signal generator asserts the reception inhibition signal for a preset period after restoration from the power-saving state to the non power-saving state is started. A request-reception decision unit is configured to determine whether the power-saving request should be accepted. The request-reception decision unit determines not to accept the power-saving request when the reception inhibition signal is asserted.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
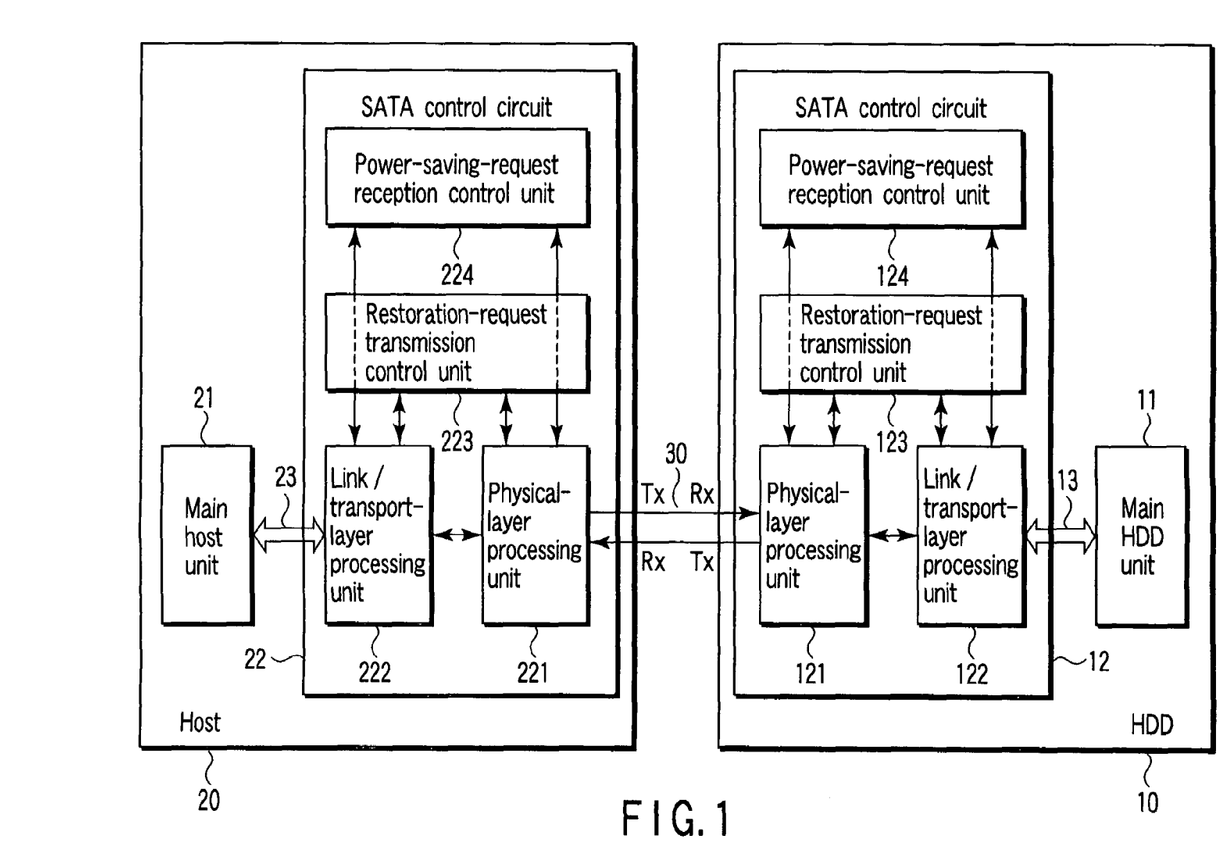
FIG. 1 is a block diagram illustrating the configuration of a system with a hard disk drive (HDD) 10 according to an embodiment of the invention.

An embodiment in which the invention is applied to a system equipped with a hard disk drive having a serial ATA interface (SATA interface) will be described in detail with reference to the accompanying drawings. FIG. 1 is a block diagram illustrating the configuration of a system with a hard disk drive (HDD) 10 according to an embodiment of the invention. The HDD 10 is a storage device (electronic device) provided with a main HDD unit 11 and SATA interface control circuit (hereinafter referred to briefly as "the SATA control circuit) 12. The main HDD unit 11 corresponds to a conventional HDD for performing parallel data transfer using a parallel ATA interface. The SATA control circuit 12 is a SATA (serial ATA) bridge for peripheral devices. The SATA control circuit 12 is connected to the main HDD unit 11 via a parallel ATA bus (hereinafter referred to as "the PATA bus") 13, and also connected to a host (host system) 20 via a serial ATA bus (hereinafter referred to as "the SATA bus") 30. The SATA control circuit 12 is formed of, for example, a bridge LSI of a single chip for performing interface conversion between the parallel ATA interface and serial ATA interface. The SATA circuit 12 has, in particular, a function for converting an instruction, sent via the SATA bus 30, into an instruction suitable for the PATA bus 13 (i.e., suitable for the parallel ATA interface), and sending it to the main HDD unit 11 via the PATA bus 13.

The SATA bus 30 can be formed of a cable or wiring pattern. The wiring pattern can be formed on, for example, the printed circuit board of the host 20.

The host 20 is an electronic device utilizing the HDD 10 as a storage device. The host 20 is, for example, a personal computer. The host 20 comprises a main host unit 21 and SATA control circuit 22. The main host unit 21 corresponds to a conventional host for transferring parallel data using a parallel ATA interface. The SATA control circuit 22 is connected to the main host unit 21 via a PATA bus (parallel ATA bus) 23, and also connected to the HDD 10 via the SATA bus (serial ATA bus) 30. In other words, the SATA control circuit 22 is a host bridge of a PATA bus connection type. Like the SATA control circuit 12 in the HDD 10, the SATA control circuit 22 is formed of a bridge LSI of a single chip for performing interface conversion between the parallel ATA interface and serial ATA interface. The SATA control circuit 22 has, in particular, a function for converting an instruction, sent via the PATA bus 23, into an instruction suitable for the SATA bus 30 (i.e., suitable for the SATA interface), and sending it to the HDD 10 via the SATA bus 30. The PATA buses 13 and 23 may be replaced with respective buses conforming thereto, e.g., peripheral component interconnect (PCI) buses. In this case, the SATA control circuits (SATA bridges) 12 and 22 may be provided in a PCI bridge.

The SATA control circuits 12 and 22 comprise physical-layer processing units 121 and 221, link/transport-layer processing units 122 and 222, restoration-request transmission control units 123 and 223, and power-saving-request reception control units 124 and 224, respectively. The physical-layer processing units 121 and 221 execute high-rate serial data transfer (transmission/reception) via the SATA bus 30. At this time, the data transfer rate is 1.5 Gbps (gigabits per second). The physical-layer processing units 121 and 221 interpret data received from the SATA bus 30, and transmits the data to the link/transport-layer processing units 122 and 222 in accordance with the interpretation results, respectively. Further, the physical-layer processing units 121 and 221 output (transmit) serial data signals in response to requests from the link/transport-layer processing units 122 and 222, respectively.

The link/transport-layer processing units 122 and 222 each include a link-layer processing unit and transport-layer processing unit, which are not shown. The respective link-layer processing units of the link/transport-layer processing units 122 and 222 supply the physical-layer processing units 122 and 221 with requests to output signals, in response to requests from the transport-layer processing units of the processing units 122 and 222. Further, the respective link-layer processing units of the processing units 122 and 222 supply the respective transport-layer processing units with data transmitted from the physical-layer processing units 121 and 221. The transport layer processing units perform interface conversion between the parallel ATA interface and serial ATA interface.

When such a situation as requires restoration from a power-saving state to an "Idle" state (non power-saving state) has occurred, restoration-request transmission control units 123 and 223 incorporated in the HDD 10 and host 20, respectively, control the time of transmission of a restoration request to the host 20 and HDD 10, respectively. The restoration-request transmission control units 123 and 223 are configured to delay the transmission of the restoration request to the host 20 and HDD 10, in consideration of an intermediate state in which transition to a power-saving state is occurring.

Power-saving-request reception control units 124 and 224 incorporated in the HDD 10 and host 20, respectively, control reception of a power-saving request transmitted from the host 20 and HDD 10, respectively. In this embodiment, when the host 20 (or HDD 10) has transmitted a power-saving request, the power-saving-request reception control unit 124 (or 224) determines whether the power-saving request transmitted from the host 20 (or HDD 10) should be accepted, in consideration of the time elapsing from the start time of the last restoration operation. In accordance with the determination result, the power-saving-request reception control unit 124 (or 224) supplies a response (acknowledge or negative acknowledge) to the host 20 (or HDD 10).

Figure 2:
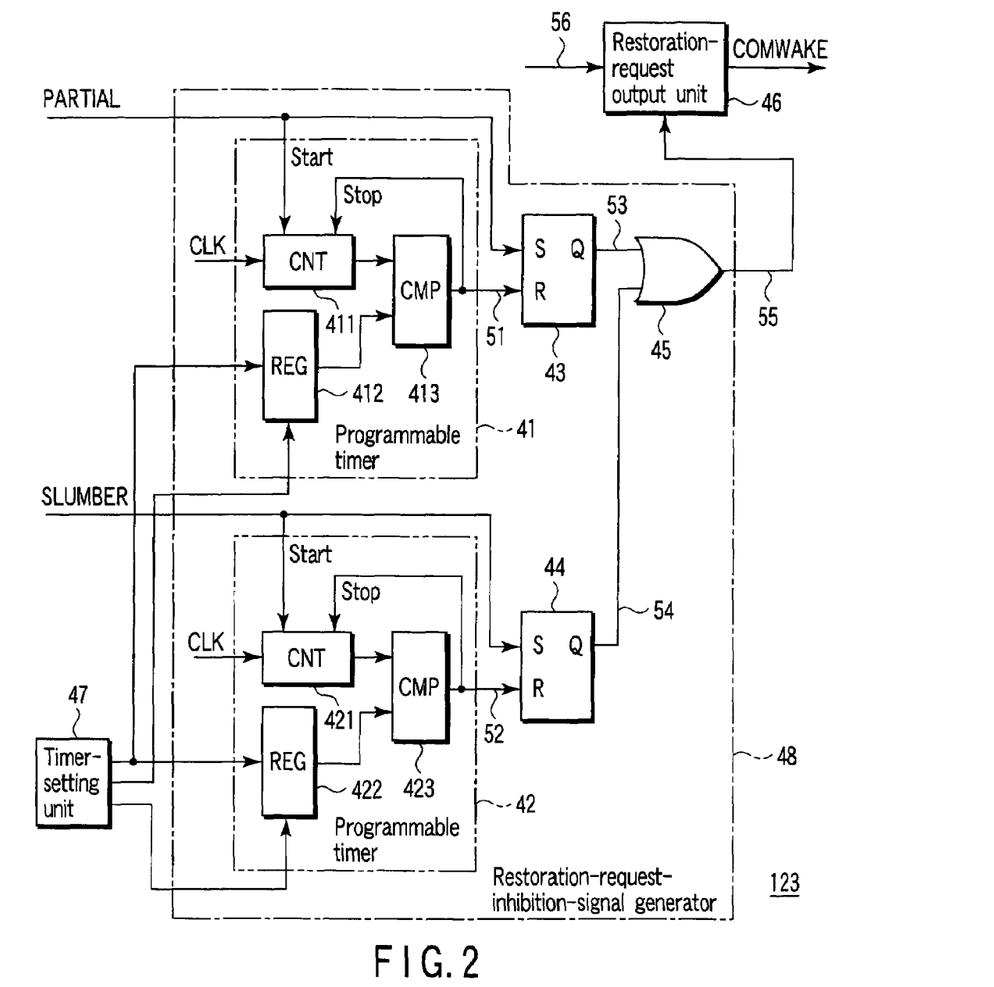
FIG. 2 is a block diagram illustrating the restoration-request transmission control unit 123 appearing in FIG. 1.

FIG. 2 is a block diagram illustrating the restoration-request transmission control unit 123. As shown, the restoration-request transmission control unit 123 comprises programmable timers 41 and 42, flip-flops 43 and 44, OR gate 45, restoration-request output unit 46 and timer-setting unit 47. The programmable timers 41 and 42 are activated, respectively, when power-saving mode signals PARTIAL and SLUMBER, for example, rise. The programmable timers 41 and 42 count pulses corresponding to predetermined interval Tp1, and pulses corresponding to predetermined interval Ts1, respectively. When signals PARTIAL and SLUMBER are, for example, at the high level, they indicate that the HDD 10 is in the "Partial" mode and "Slumber" mode, respectively. After measuring interval Tp1 and Ts1, the programmable timers 41 and 42 output timeout signals 51 and 52, respectively. The programmable timers 41 and 42 comprise counters (CNT) 411 and 421, registers (REG) 412 and 422, and comparators (CMP) 413 and 423, respectively.

The flip-flops 43 and 44 are, for example, RS flip-flops. The flip-flops 43 and 44 each have terminals R, S and Q. The terminals S of the flip-flops 43 and 44 receive power-saving mode signals PARTIAL and SLUMBER, respectively. The terminals R of the flip-flops 43 and 44 receive timeout signals 51 and 52, respectively. The signals output from the terminals Q of the flip-flops 43 and 44 are used as restoration-request inhibition signals 53 and 54 for inhibiting the transmission of restoration-request signal pattern COMWAKE, respectively. The OR gate 45 acquires the logical sum of the restoration-request inhibition signals 53 and 54. The output signal of the OR gate 45 is used as restoration-request inhibition signal 55. In other words, the programmable timers 41 and 42, flip-flops 43 and 44 and OR gate 45 constitute a restoration-request-inhibition-signal generator 48 for generating restoration-request inhibition signal 55.

The restoration-request output unit 46 outputs restoration-request signal pattern COMWAKE in accordance with occurrence of restoration request 56 in the HDD 10. Restoration request 56 indicates that restoration from the power-saving state to the "Idle" state is needed. Restoration-request signal pattern COMWAKE is a particular signal pattern used to request a node connected to the HDD 10 (in this case, the host 20), to be restored from the power-saving state to the "Idle" state. The restoration-request output unit 46 determines the output time of restoration-request signal pattern COMWAKE in accordance with restoration-request inhibition signal 55. In this embodiment, the restoration-request output unit 46 inhibits the transmission of restoration-request signal pattern COMWAKE while restoration-request inhibition signal 55 is asserted (restoration-request inhibition period). In accordance with a timer-setting command from, for example, the host 20, the timer-setting unit 47 sets a timer value, designated by the command, in the one of the registers 412 and 422 of the programmable timers 41 and 42 that is designated by the command. The restoration-request transmission control unit 223 has the same configuration as the restoration-request transmission control unit 123 shown in FIG. 2.

Figure 3:
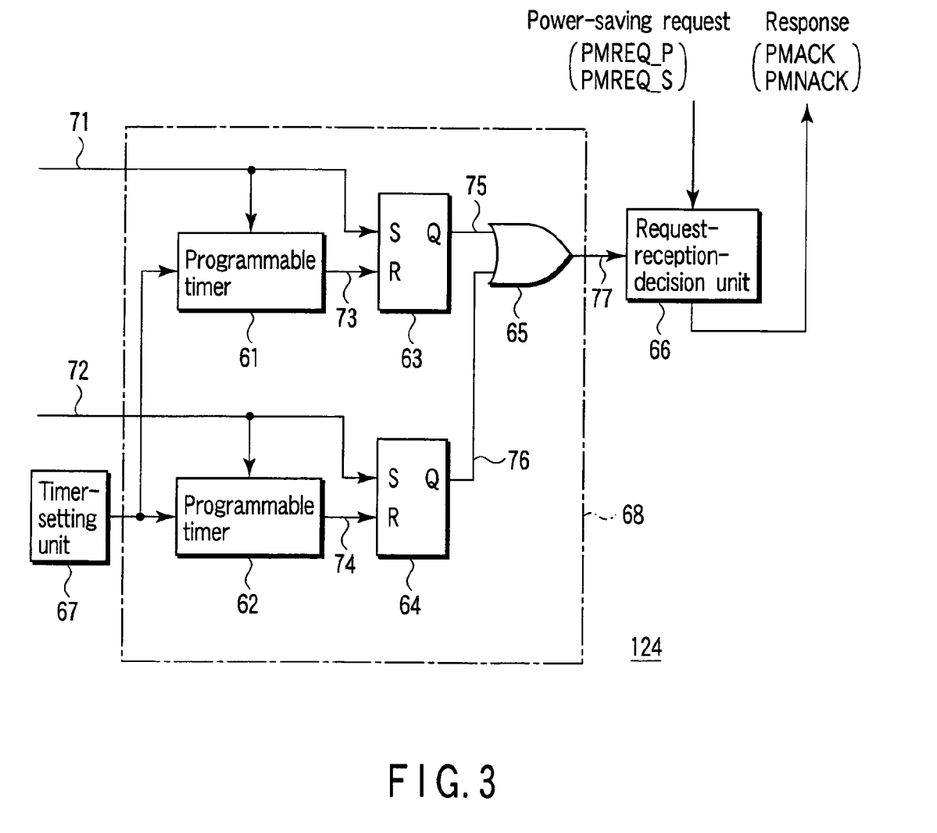
FIG. 3 is a block diagram illustrating the power-saving-request reception control unit 124 appearing in FIG. 1.

FIG. 3 is a block diagram illustrating the power-saving-request reception control unit 124. As shown in FIG. 3, the power-saving-request reception control unit 124 comprises programmable timers 61 and 62, flip-flops 63 and 64, OR gate 65, request-reception-decision unit 66 and timer-setting unit 67. The programmable timers 61 and 62 are activated, respectively, when restoration-operation start signals 71 and 72, for example, rise. The programmable timers 61 and 62 count pulses corresponding to predetermined interval Tp2, and pulses corresponding to predetermined interval Ts2, respectively. Restoration-operation start signal 71 indicates the start time of restoration from a power-saving state ("Partial" state) in the "Partial" mode to the "Idle" state, while restoration-operation start signal 72 indicates the start time of restoration from a power-saving state ("Slumber" state) in the "Slumber" mode to the "Idle" state. After measuring interval Tp2 and Ts2, the programmable timers 61 and 62 output timeout signals 73 and 74, respectively. The programmable timers 61 and 62 have the same structures as the programmable times 41 and 42 shown in FIG. 2, although FIG. 3 does not show them.

The flip-flops 63 and 64 are, for example, RS flip-flops. The terminals S of the flip-flops 63 and 64 receive restoration-operation start signals 71 and 72, respectively. The terminals R of the flip-flops 63 and 64 receive timeout signals 73 and 74, respectively. The signals output from the terminals Q of the flip-flops 63 and 64 are used as reception inhibition signals 75 and 76 for inhibiting the reception of a power-saving request, respectively. The OR gate 65 acquires the logical sum of the reception inhibition signals 75 and 76. The output signal of the OR gate 65 is used as reception inhibition signal 77. In other words, the programmable timers 61 and 62, flip-flops 63 and 64 and OR gate 65 constitute a reception-inhibition-signal generator 68 for generating reception inhibition signal 77.

The request-reception-decision unit 66 determines whether a power-saving request from a node connected to the HDD 10 (in this case, the host 20) should be accepted. In this embodiment, if the request-reception-decision unit 66 accepts a power-saving request from the host 20 while reception inhibition signal 77 is asserted, it returns a negative acknowledge to the host 20. In accordance with a timer-setting command from the host 20, the timer-setting unit 67 sets, like the timer-setting unit 47 of FIG. 2, a timer value designated by the command, in the one of the registers of the programmable timers 61 and 62 that is designated by the command. It is also possible that the timer-setting unit 47 is made to perform timer value setting for the programmable timers 61 and 62.

The function of the embodiment will now be described by mainly describing the operations of the restoration-request transmission control unit 123 and power-saving-request reception control unit 124 included in the SATA control circuit 12 of the HDD 10. Firstly, the operation of the restoration-request transmission control unit 123 will be described referring to the timing chart of FIG. 4. Assume here that the SATA control circuit 12 of the HDD 10 has performed an operation for transition from the "Idle" state (non power-saving state) to, for example, the "Partial" state as a power-saving state. The SATA control circuit 12 performs the operation, for example, upon receiving a "Partial" mode request from the host via the SATA bus 30. The SATA control circuit 12 also performs the operation when it receives, from the main HDD unit 11 of the HDD 10, a "Partial" mode request to be transmitted to the host 20. The "Partial" mode request is a power-saving mode request. In any case, both the SATA control circuit 12 of the HDD 10 and the SATA control circuit 22 of the host 20 perform an operation for transition to the "Partial" state. As a result, the HDD 10 and host 20 are switched from the "Idle" mode to the "Partial" mode. However, it should be noted that the time required by each of the circuit elements as power-saving targets to finish its transition to the "Partial" state differs between them, the circuit elements being included in the physical-layer processing unit 121 and link/transport-layer processing unit 122 of the SATA control circuit 12. In other words, the physical-layer processing unit 121 and link/transport-layer processing unit 122 assume an intermediate state in which they are shifting to the "Partial" state (power-saving state). The same can be said of the physical-layer processing unit 221 and link/transport-layer processing unit 222 of the SATA control circuit 22.

Figure 4:
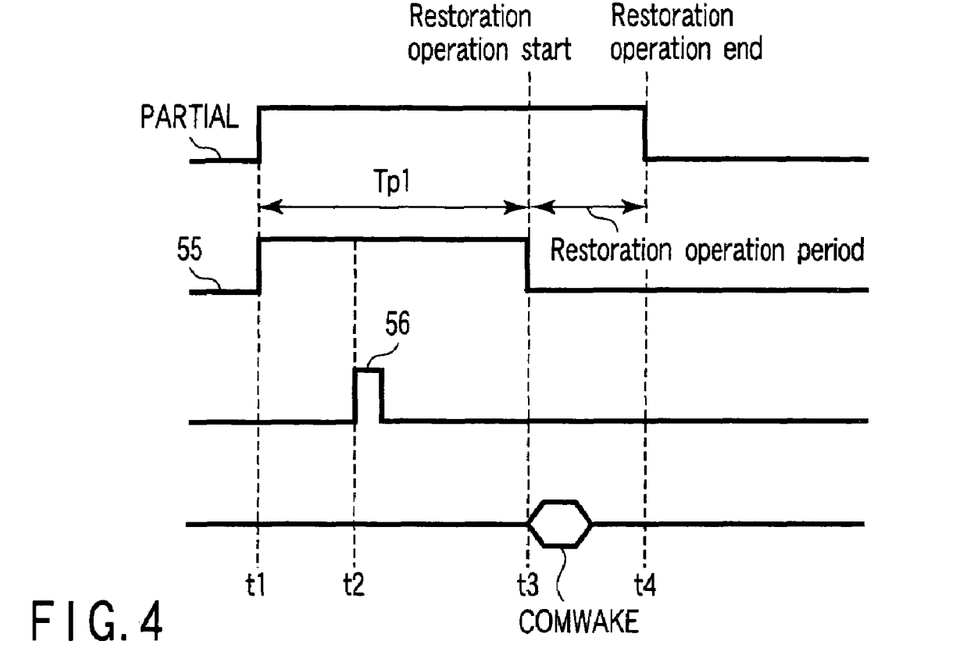
FIG. 4 is a timing chart illustrating the operation timing of the restoration-request transmission control unit 123.

Therefore, if such a situation as requires restoration from the "Partial" state to the "Idle" state has occurred immediately after transition to the "Partial" state is started, it is possible that restoration from the "Partial" state to the "Idle" state cannot reliably be executed. In light of this, the following mechanism is employed to delay the transmission of restoration-request signal pattern COMWAKE until predetermined interval Tp1 elapses from the start of transition to the "Partial" state.

Firstly, assume that at time t1, the SATA control circuit 12 receives a "Partial" mode request and starts transition to the "Partial" state. At this time, power-saving mode signal PARTIAL assumes the high level as shown, for example, in FIG. 4. When signal PARTIAL is at the high level, the counter 411 of the programmable timer 41 resets its count value to zero, and starts counting in accordance with clock signal CLK input thereto.

Further, when power-saving mode signal PARTIAL is at the high level, the flip-flop 43 is set, whereby the signal output from the terminal Q of the flip-flop 43, i.e., restoration-request inhibition signal 53, is asserted. Restoration-request inhibition signal 53 is input to one terminal of the OR gate 45. The other terminal of the OR gate 45 is supplied with restoration-request inhibition signal 54 that is negated. Accordingly, the OR gate 45 outputs, as restoration-request inhibition signal 55, a signal corresponding to the state of restoration-request inhibition signal 53. That is, restoration-request inhibition signal 55 is asserted at time t1.

The register 412 in the programmable timer 41 holds interval Tp1 to be measured by the counter 411 of the programmable timer 41. Interval Tp1 is set by the timer-setting unit 47 in accordance with, for example, a timer-setting command from the host 20. Thus, the register 412 can hold an arbitrary value (timer value) as interval Tp1. The counter 411 increments its count value each time clock signal CLK rises. The comparator 413 compares the value of the counter 411 with interval Tp1 held by the register 412. If the value of the counter 411 is equal to interval Tp1, i.e., if the counter 411 has measured interval Tp1, the comparator 413 asserts timeout signal 51. When timeout signal 51 is asserted, the counter 411 stops counting.

When timeout signal 51 is asserted, the flip-flop 43 is reset. As a result, restoration-request inhibition signal 53 output from the terminal Q of the flip-flop 43 is negated. When restoration-request inhibition signal 53 is negated, restoration-request inhibition signal 55 is also negated. As shown in FIG. 4, restoration-request inhibition signal 55 is negated at time t3, which follows time t1, at which signal 55 is asserted, by interval Tp1.

On the other hand, the restoration-request output unit 46 monitors the occurrence of restoration request 56. Upon detecting the occurrence of restoration request 56, the restoration-request output unit 46 confirms, from the state of restoration-request inhibition signal 55, whether a restoration request is inhibited. Assume here that restoration request 56 has been issued at time t2 within the period in which restoration-request inhibition signal 55 is asserted, as is shown in FIG. 4. In this case, the restoration-request output unit 46 does not immediately output restoration-request signal pattern COMWAKE even if it detects restoration request 56, but waits for restoration-request inhibition signal 55 being negated. At time t3 at which restoration-request inhibition signal 55 is negated, the restoration-request output unit 46 outputs restoration-request signal pattern COMWAKE in response to restoration request 56. Restoration-request signal pattern COMWAKE is sent by the physical-layer processing unit 121 to the host 20 via the SATA bus 30.

Then, the physical-layer processing unit 121 and link/transport-layer processing unit 122, included in the SATA control circuit 12 of the HDD 10, execute restoration from the "Partial" state to the "Idle" state. On the other hand, the physical-layer processing unit 221 and link/transport-layer processing unit 222, included in the SATA control circuit 22 of the host 20, also execute restoration from the "Partial" state to the "Idle" state in accordance with restoration-request signal pattern COMWAKE received.

As described above, restoration-request signal pattern COMWAKE is transmitted from the SATA control circuit 12 of the HDD 10 to the host 20 after interval Tp1 from the start of transition to the "Partial" state. Interval Tp1 is set in consideration of the intermediate state ranging from the start of transition to the "Partial" state to the end of the transition. In the embodiment, interval Tp1 is set to, for example, 5 µs that is sufficient for completing the transition to the "Partial" state. This prevents restoration from the power-saving state to the non power-saving state from being requested of the host 20 during the period in which the host 20 is expected to assume the intermediate state before the completion of transition to the power-saving state. Even if restoration request 56 is issued by the HDD 10 immediately after the start of transition to the "Partial" state, restoration from the power-saving state to the non power-saving state is requested of the host 20 after interval Tp1 (in which the host is expected to assume the intermediate state) elapses. Accordingly, the host 20 can be prevented from failing to receive a restoration request because of the intermediate state. As a result, both the HDD 10 and host 20 can reliably return from the "Partial" state to the "Idle" state, thereby activating the SATA bus 30 to perform data communication using the SATA bus 30.

In the SATA control circuit 12, the power-saving states of the physical-layer processing unit 121 and link/transport-layer processing unit 122 can be confirmed. Therefore, if the completion of transition to the power-saving state ("Partial" state) in the SATA control circuit 12 can be confirmed, restoration from the "Partial" state to the "Idle" state may be started in the SATA control circuit 12 before restoration-request inhibition signal 55 is negated. Further, if restoration request 56 is issued where restoration-request inhibition signal 55 is negated, the restoration-request output unit 46 immediately outputs restoration-request signal pattern COMWAKE.

It is assumed that the above-described operations are performed when a restoration request occurs in the HDD 10 immediately after transition to the "Partial" state is started. However, it is apparent that the restoration-request transmission control unit 123 performs operations similar to the above-described ones also when a restoration request occurs in the HDD 10 immediately after transition to the "Slumber" state is started. In this case, however, the transmission of a restoration request is inhibited within interval Ts1 after the start of transition to the "Slumber" state. Interval Ts1 is set in consideration of the intermediate state ranging from the start of transition to the "Slumber" state to the end of the transition. In this embodiment, interval Ts1 is set to a value sufficient for completing the transition to the "Slumber" state. Ts1>Tp1, which is determined from the difference in definition between the times required for restoration from the "Partial" and "Slumber" states to the "Idle" state. Furthermore, if the relationship between the HDD 10 and host 20 is opposite to the above, the restoration-request transmission control unit 223 of the host 20 performs operations similar to the above-described ones.

Figure 5:
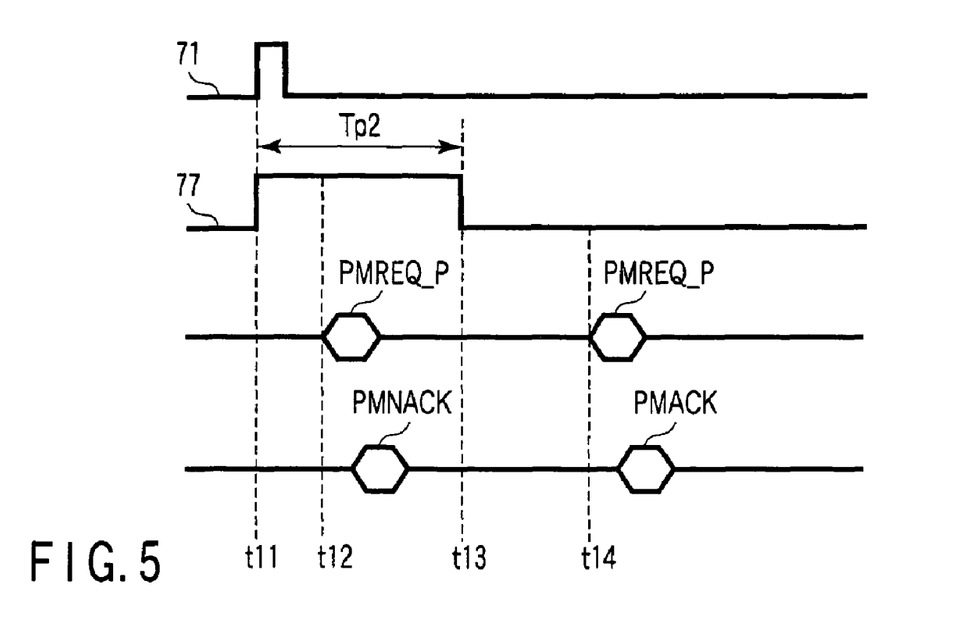
FIG. 5 is a timing chart illustrating the operation timing of the power-saving-request reception control unit 124.

Referring now to the timing chart of FIG. 5, a description will be given of the operation of the power-saving-request reception control unit 124 included in the SATA control circuit 12 of the HDD 10. Firstly, assume that a request for restoration from the "Partial" state (power-saving state) to the "Idle" state occurs in one of the HDD 10 and host 20, i.e., in the HDD 10, for example. The occurrence of the restoration request in the HDD 10 means that it becomes necessary to operate the SATA bus 30 after the completion of restoration. For example, when it is necessary to transmit data using the SATA bus 30, a restoration request occurs. In this case, the SATA control circuit 12 of the HDD 10 starts restoration of itself after delaying the restoration operation by the host 20 in the above-described procedure.

The power-saving mode ("Partial" or "Slumber" mode) can be controlled by both the HDD 10 and host 20. Therefore, it is possible that the host 20 issues a power-saving request after the SATA control circuit 12 of the HDD 10 starts the operation of restoration for data transmission, and before data transmission is performed. In this case, if the SATA control circuit 12 of the HDD 10 immediately accepts the power-saving request, the restoration operation is interrupted and wasted. To avoid this, in the embodiment, no power-saving request is accepted in the manner described below until a preset period elapses from the start of the restoration operation, in consideration of the intermediate state in which transition to the power-saving state is occurring. This preset period corresponds to interval Tp2 shown in FIG. 5 in the case of restoration from the "Partial" state.

Assume here that the SATA control circuit 12 of the HDD 10 has started restoration from the "Partial" state to the "Idle" state. At this time, restoration operation start signal 71 becomes high for a predetermined period as shown in, for example, FIG. 5. The programmable timer 61 resets its count value to zero in accordance with the leading edge of restoration operation start signal 71, and starts to measure time.

When restoration operation start signal 71 is at the high level, the flip-flop 63 is set. As a result, the signal output from the terminal Q of the flip-flop 63, i.e., reception inhibition signal 75, is asserted. Reception inhibition signal 75 is input to a terminal of the OR gate 65. The other terminal of the OR gate 65 is supplied with reception inhibition signal 76 that is negated. Accordingly, the OR gate 85 outputs, as reception inhibition signal 77, a signal corresponding to the state of reception inhibition signal 75. That is, reception inhibition signal 77 is asserted at time t11.

The programmable timer 61 measures interval Tp2 preset therein by the timer-setting unit 67. After finishing the measurement of interval Tp2, the programmable timer 61 asserts timeout signal 73, and stops time measurement. When timeout signal 73 is asserted, the flip-flop 63 is reset. As a result, reception inhibition signal 75 output from the terminal Q of the flip-flop 63 is negated. When reception inhibition signal 75 is negated, reception inhibition signal 77 is also negated. As shown in FIG. 5, reception inhibition signal 77 is negated at time t13, which follows time t11, at which signal 77 is asserted, by interval Tp2.

On the other hand, the request-reception-decision unit 66 monitors a power-saving request (power management request) from the host 20, e.g., primitive "PMREQ_P" or primitive "PMREQ_S". Primitive "PMREQ_P" is a power-saving request for designating the "Partial" mode, and primitive "PMREQ_S" is a power-saving request for designating the "Slumber" mode.

Upon detecting a power-saving request, the request-reception-decision unit 66 confirms, from the state of reception inhibition signal 77, whether reception of a power-saving request is inhibited. Assume here that the host 20 has transmitted primitive "PMREQ_P" at time t12 within a period in which reception inhibition signal 77 is asserted, as is shown in FIG. 5. In this case, in response to primitive "PMREQ_P", the request-reception-decision unit 66 outputs, for example, primitive "PMNACK" as a negative acknowledge for informing that reception of the power-saving request designated by the primitive "PMREQ_P" is inhibited. Primitive "PMNACK" is transmitted from the physical-layer processing unit 121 to the host 20 via the SATA bus 30.

As described above, in the embodiment, when the SATA control circuit 12 of the HDD 10 starts restoration from the power-saving state to the "Idle" state (non power-saving state) and immediately thereafter it receives a request for a power-saving state, it does not accept the power-saving request from the host 20 within interval Tp2 after the start of the restoration operation. As a result, the SATA control circuit 12 of the HDD 10 is free from the problem that transition to the power-saving state is again performed before restoration from the power-saving state to the non power-saving state is completed and the SATA bus 30 is used. In other words, the SATA circuit 12 is free from the problem due to the existence of the above-described intermediate state related to power saving. Accordingly, the SATA control circuit 12 of the HDD 10 enables the host 20 to perform a restoration operation in accordance with the above-mentioned delayed restoration request (restoration-request signal pattern COMWAKE) when the host 20 is not in an unstable state due to a power-saving operation. Further, even if the SATA control circuit 12 receives a power-saving request from the host 20 immediately after a restoration operation is started for data transmission, it can accomplish data transmission regardless of the power-saving request. In other words, the SATA control circuit 12 is free from the problem that immediately after it starts restoration from the power-saving state ("Partial" state) to the "Idle" state, it receives another power-saving request and again shifts to the power-saving state ("Partial" state), and then restarts restoration from the power-saving state to the "Idle" state.

It is assumed that the above-described operations are performed when a power-saving request occurs in the host 20 immediately after restoration from the "Partial" state to the "Idle" state is started in the HDD 10. However, it is apparent that the power-saving-request reception control unit 124 performs operations similar to the above-described ones also when a power-saving request occurs in the host 20 immediately after restoration from the "Slumber" state to the "Idle" state is started in the HDD 10. In this case, however, the reception of a power-saving request from the host 20 is inhibited within interval Ts2 after the start of the restoration. In this embodiment, Ts2>Tp2, which is determined from the difference in definition between the times required for restoration from the "Partial" and "Slumber" states to the "Idle" state. Furthermore, if the relationship between the HDD 10 and host 20 is opposite to the above, power-saving-request reception control unit 224 of the host 20 performs operations similar to the above-described ones.

The embodiment described above is directed to a system equipped with an HDD (hard disk drive). However, the present invention is also applicable to a system equipped with a disk drive other than HDDs, such as an optical disk drive, magneto-optical disk drive, etc. It is sufficient if the disk drive has a serial ATA interface. The present invention is further applicable to a system equipped with an external storage device other than disk drives, such as a magnetic tape drive. In this case as well, it is sufficient if the external storage device has a serial ATA interface. The present invention is yet further applicable to a system equipped with an electronic device other than a disk drive, if the electronic device has a serial ATA interface.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic device comprising:
a serial ATA interface to transmit data to another electronic device with a serial ATA interface connected thereto via a bus;
an inhibition-signal generator configured to generate an inhibition signal used to inhibit at least one of (1) in a first case in which said inhibition signal is asserted for a first preset period of time, transmission of a restoration-request signal pattern for requesting said another electronic device to restore the serial ATA interface of said another electronic device from a power-saving state to the non power-saving state, and (2) in a second case in which said inhibition signal is asserted for a second preset period of time, a reception of a power-saving request supplied from said another electronic device for requesting the serial ATA interface of said electronic device to shift to a power-saving state from a non power saving state; and
an output unit configured to output a restoration-request signal pattern, to be transmitted to said another electronic device, in response to a request for restoration from a power-saving state to a non power-saving state, the request occurring in the electronic device, the output unit delaying the output of the restoration-request signal pattern until the inhibition signal is negated, when the restoration request occurs in said first preset period of time in which the inhibition signal is asserted.

2. The electronic device according to claim 1, wherein said inhibition-signal generator includes:
a timer which starts measurement of the first preset period of time when transition to the power-saving state is started; and
a flip-flop to be set when transition to the power-saving state is started, thereby asserting the inhibition signal, and to be reset when the timer finishes the measurement of the first preset period of time, thereby negating the inhibition signal.

3. The electronic device according to claim 2, wherein the timer is a programmable timer, a timer value of which can be set from a device external to said inhibit signal generator, the timer value indicating a to-be-measured period.

4. The electronic device according to claim 1, wherein in said first case:
when the power-saving state is a "Partial" state, a first period corresponding to the "Partial" state is used as the first preset period of time; and
when the power-saving state is a "Slumber" state, a second period corresponding to the "Slumber" state is used as the first preset period of time.

5. The electronic device according to claim 4, wherein the inhibition-signal generator includes:
a first timer which starts measurement of the first period when transition to the "Partial" state is started;
a second timer which starts measurement of the second period when transition to the "Slumber" state is started;
a first flip-flop to be set when transition to the "Partial" state is started, thereby asserting a first signal, and to be reset when the first timer finishes the measurement of the first period, thereby negating the first signal;
a second flip-flop to be set when transition to the "Slumber" state is started, thereby asserting a second signal, and to be reset when the second timer finishes the measurement of the second period, thereby negating the second signal; and
an OR gate which acquires a logical sum of the first signal and the second signal, and outputs the logical sum as the inhibition signal.

6. The electronic device according to claim 5, wherein;
the first timer comprises a first programmable timer, a timer value of which can be set from a device external to said inhibition signal generator, the timer value of the first programmable timer indicating the first period to be measured; and
the second timer comprises a second programmable timer, a timer value of which can be set from a device external to said inhibition signal generator, the timer value of the second programmable timer indicating the second period to be measured.

7. The electronic device as recited in claim 1 further comprising a decision unit configured to determine whether the power-saving request should be accepted, the decision unit determining not to accept the power-saving request when the inhibition signal is asserted during said second preset period of time.

8. The electronic device according to claim 7, wherein the inhibition-signal generator includes:
a timer which starts measurement of the second preset period of time when restoration from the power-saving state to the non power-saving state is started; and
a flip-flop to be set when restoration from the power-saving state to the non power-saving state is started, thereby asserting the inhibition signal, and to be reset when the timer finishes the measurement of the second preset period of time, thereby negating the inhibition signal.

9. The electronic device according to claim 8, wherein the timer comprises a programmable timer, a timer value of which can be set from a device external to said inhibition signal generator, the timer value indicating a to-be-measured period.

10. The electronic device according to claim 7, wherein:
when the power-saving state is a "Partial" state, a first period corresponding to the "Partial" state is used as the second preset period of time; and
when the power-saving state is a "Slumber" state, a second period corresponding to the "Slumber" state is used as the second preset period of time.

11. The electronic device according to claim 7, wherein the inhibition signal generator includes:
a first timer which starts measurement of the first period when restoration from the "Partial" state to the non power-saving state is started;
a second timer which starts measurement of the second period when restoration from the "Slumber" state to the non power-saving state is started;
a first flip-flop to be set when restoration from the "Partial" state to the non power-saving state is started, thereby asserting a first signal, and to be reset when the first timer finishes the measurement of the first period, thereby negating the first signal;
a second flip-flop to be set when restoration from the "Slumber" state to the non power-saving state is started, thereby asserting a second signal, and to be reset when the second timer finishes the measurement of the second period, thereby negating the second signal; and
an OR gate which acquires a logical sum of the first signal and the second signal, and outputs the logical sum as the inhibition signal.

12. The electronic device according to claim 11, wherein;
the first timer comprises a first programmable timer, a timer value of which can be set from a device external to said inhibition signal generator, the timer value of the first programmable timer indicating the first period to be measured; and
the second timer is a second programmable timer, a timer value of which can be set from a device external to said inhibition signal generator, the timer value of the second programmable timer indicating the second period to be measured.

13. A method of controlling power saving in an electronic device with a serial ATA interface, comprising:
asserting an inhibition signal in at least one of:
(1) in a first case in which transition to a power-saving state is started in the serial ATA interface of the electronic device, the inhibition signal being used to inhibit transmission of a restoration-request signal pattern for requesting another electronic device with a serial ATA interface to restore the serial ATA interface of said another electronic device from the power-saving state to a non power-saving state, said another electronic device being connected to the electronic device via a serial ATA bust and
(2) in a second case in which restoration from a power-saving state to a non power-saving state is started in the serial ATA interface of said electronic device, the inhibition signal being used to inhibit reception of a power-saving request for requesting transition of the serial ATA interface of said electronic device to the power-saving state, the Power-saving request being supplied from said another electronic device connected to the electronic device via the serial ATA bus,
further comprising, in the first case:
a) negating the inhibition signal for a first preset period of time after transition to the power-saving state is started; and b) delaying output of the restoration-request signal pattern until the inhibition signal is negated, when a restoration request occurs in said first preset period of time in which the inhibition signal is asserted.

14. The method according to claim 13, wherein:
when the power-saving state is a "Partial" state, a first period corresponding to the "Partial" state is used as one of the first and second preset periods of time; and
when the power-saving state is a "Slumber" state, a second period corresponding to the "Slumber" state is used as one of the first and second preset periods of time.

15. The method as recited in claim 13 further comprising, in the second case:
a) negating the inhibition signal for a second preset period of time after transition to the non power-saving state is started; and
b) delaying output of the restoration-request signal pattern until the inhibition signal is negated, when a restoration request occurs in said second preset period of time in which the inhibition signal is asserted.

16. An electronic device comprising:
a serial ATA interface for transmitting data to another electronic device with a serial ATA interface connected thereto via a bus,
an inhibition-signal generator configured to generate an inhibition signal to inhibit at least one of (1) a restoration request and (2) a power saving request, said restoration request requesting said another electronic device to restore the serial ATA interface of said another electronic device from a power-saving state to the non Power-saving state, and said power saving request being supplied from said another electronic device to said electronic device for requesting the serial ATA interface of said electronic device to shift to a Power-saving state from a non power saving state; and
an output unit configured to output a restoration-request signal pattern, to be transmitted to said another electronic device, in response to said restoration request, the output unit delaying the output of the restoration-request signal pattern until the inhibition signal is negated, when the restoration request occurs in a first preset period of time in which the inhibition signal is asserted.

17. The electronic device as recited in claim 16 further comprising:
a decision unit configured to determine whether the power-saving request should be accepted, the decision unit determining not to accept the power-saving request when the power saving request occurs during a second preset period of time in which the inhibition signal is asserted.

* * * * *